July 26, 1955            I. BLOCH            2,714,170
NEUTRON SELECTOR
Filed May 24, 1946            2 Sheets-Sheet 1
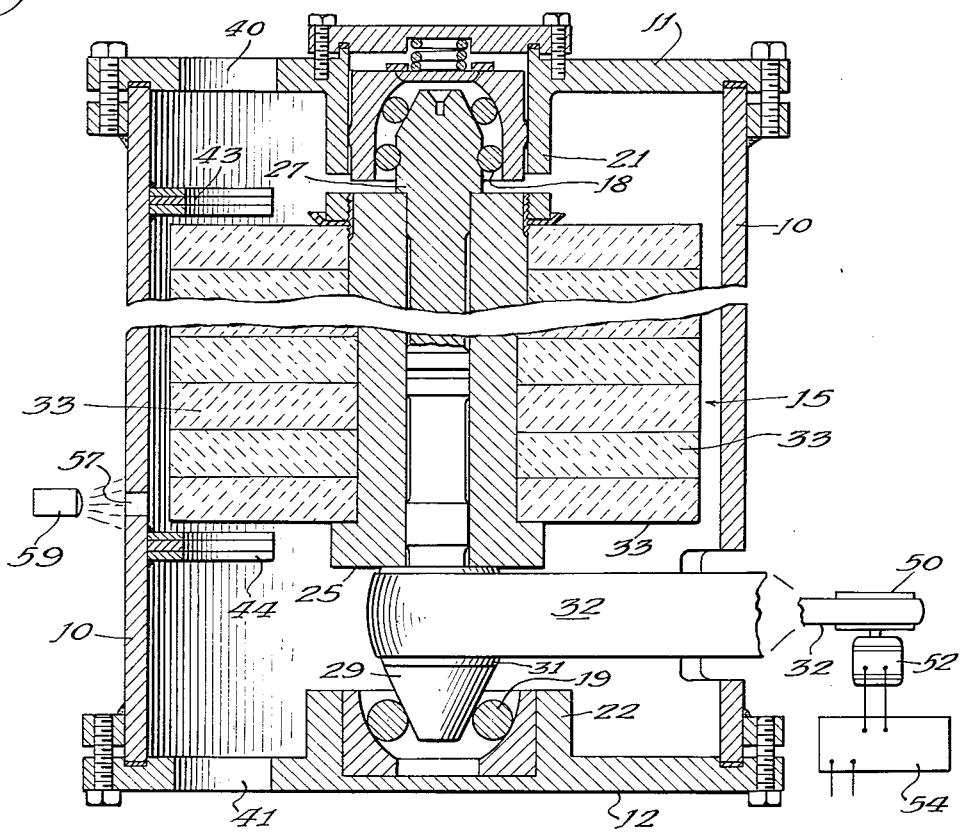
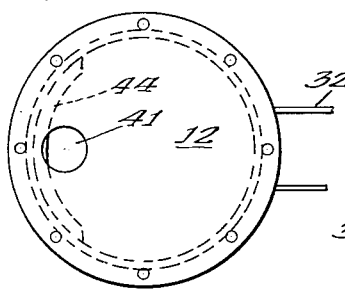
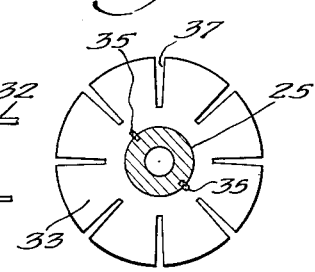
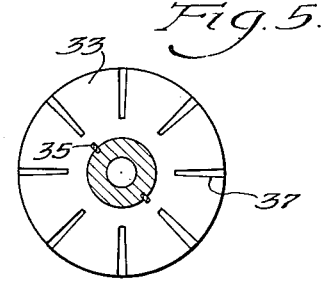
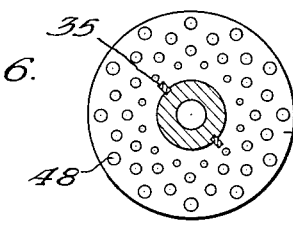
Witness:
Walter L. Schlegel, Jr.
Inventor:
Ingram Bloch
By Robert A. Lavender
Attorney July 26, 1955  I. BLOCH  2,714,170
NEUTRON SELECTOR
Filed May 24, 1946 2 Sheets-Sheet 2
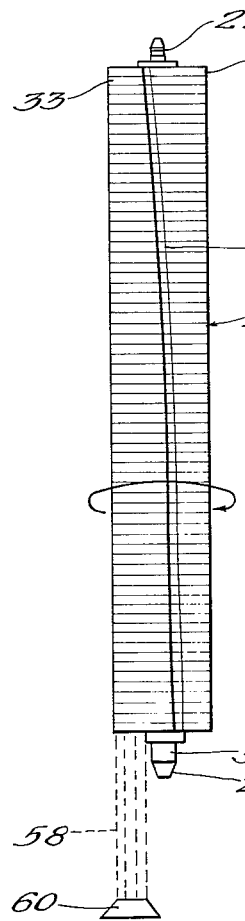
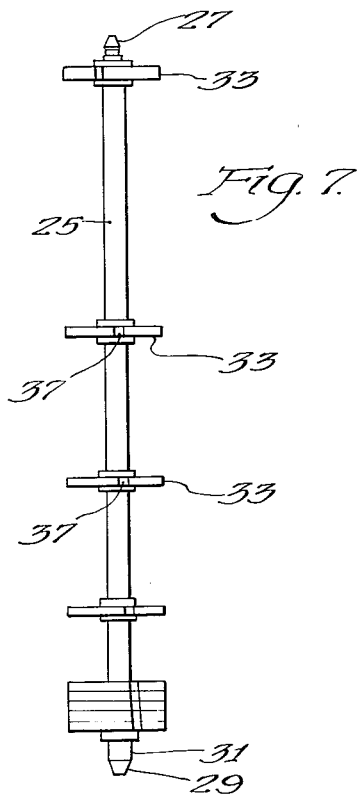
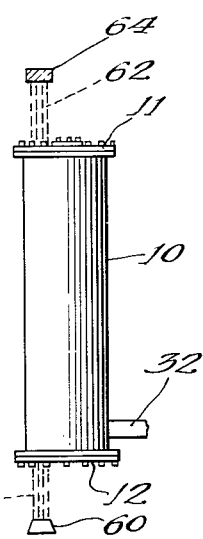
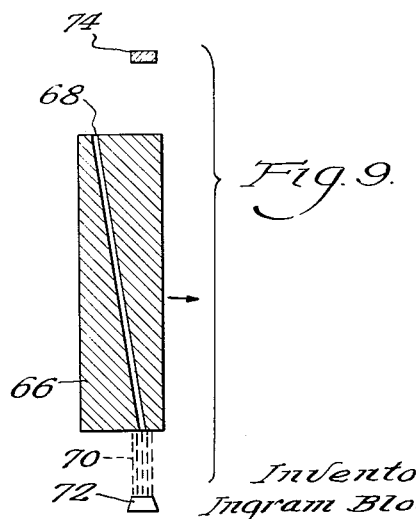
Witness:
Walter J. Schlegel, Jr.
Inventor:
Ingram Bloch
By: Robert A. Lavender
Attorney

United States Patent Office 2,714,170
Patented July 26, 1955

2,714,170

NEUTRON SELECTOR

Ingram Bloch, Chicago, Ill., assignor to the United States of America as represented by the United States Atomic Energy Commission Application May 24, 1946, Serial No. 671,980

2 Claims. (Cl. 250—84)

This invention relates to means for selecting neutrons of a predetermined velocity from the neutrons of various velocities emanating from a source, and is more particularly directed to a novel apparatus adapted to sort out desired neutrons mechanically.

Various so called neutron velocity selectors have been designed that are, in fact, devices that determine the velocity of neutrons emanating from a source but do not eliminate neutrons of unwanted velocities. In other words, they are capable of indicating the quantities of neutrons of various velocities but not of actually selecting desired neutrons.

It is often desirable in neutronic studies to subject a material to bombardment by neutrons of a predetermined velocity. For example, it has been found that absorption of neutrons by most materials varies with the velocity of the neutron. It is, therefore, desirable to establish these relationships for various materials. For this purpose, it is desirable to provide some means of supplying neutrons at energies within a predetermined narrow range.

It is the principal object of the invention, therefore, to provide a novel apparatus for selecting neutrons of predetermined velocity from a source of neutrons of various velocities.

A more particular object is to provide a neutron velocity selector in which an effective passageway for neutrons is so moved relative to a neutron beam as to restrict passage of neutrons therethrough to those having a predetermined velocity.

More detailed objects of the invention will be apparent from the following description of a preferred embodiment of the invention described in the specification and appended claims together with the drawings, in which:

Fig. 1 is a fragmentary central vertical sectional view partially in elevation of a neutron velocity selector, the rotor actuating mechanism being shown in reduced size;

Fig. 2 is a bottom plan view of the selector shown in Fig. 1;

Fig. 3 is a side elevation of the rotor of the device of Fig. 1, showing for the sake of clarity only one helical passageway;

Fig. 4 is a sectional view through the rotor shaft showing one form of disk suitable for incorporation in the rotor shown in Figs. 1 and 2;

Fig. 5 is a view similar to Fig. 4 illustrating an alternate disk structure;

Fig. 6 is a view similar to Fig. 4 illustrating another alternate disk structure;

Fig. 7 is a view similar to Fig. 3 illustrating an alternate rotor structure;

Fig. 8 is a diagram showing the selector in side elevation, in combination with a beam of neutrons and a sample bombarded by neutrons within a predetermined energy range selected from said beam by said selector; and Fig. 9 is a diagram showing a modification of the selector particularly adapted for intermittent selection of neutrons.

Figs. 1 through 6 illustrate a neutron velocity selector including a frame 10 which in the illustrated embodiment of the invention is in the form of a steel tube which has bolted thereto an upper end plate 11 and a lower end plate 12. A rotor 15 is pivotally supported in the upper end plate 11 by ball bearings 18 and in the lower end plate 12 by ball bearings 19. The bearings 18 and 19 are carried in wells 21 and 22 disposed, respectively, in the end plates 11 and 12.

The rotor 15 includes an axle or shaft 25 that may be tubular with an upper spindle 27 inserted therein and supported by the upper bearings 18. A lower spindle 29 is carried in the lower end of the shaft 25 and is supported by the lower bearings 19. In addition, the spindle 29 is shaped to form a pulley or friction surface 31 that is adapted to be engaged by a power driven belt 32 for rotating the rotor 15.

A plurality of identical disks 33 are stacked on the rotor shaft 25 and are keyed thereto as shown in Fig. 4. A pair of helical keyways are cut in the shaft 25 and a pair of complementary keys 35 cooperate with the keyways in the disks 33 to position the various disks with respect to the shaft. Each disk has one or more openings or slots 37 therein that bear a predetermined angular relationship to the keyways. Since the keyways in the shaft 25 are helically cut, the openings in the several disks 33 will form collectively one or more helical passageways 39 extending longitudinally through the rotor as seen in Fig. 3.

Each disk 33 of the type shown in Fig. 4 is made of any convenient material of sufficient strength that is relatively impervious to neutrons such as boron steel or ordinary steel that is cadmium plated. The openings 37 in this case are filled with air, and are, therefore, relatively pervious to neutrons. The source of neutrons is preferably a columnated neutron beam lying parallel to the axis of rotation of the rotor 15. The upper and lower end plates 11 and 12 associated with the frame 10 are provided with openings 40 and 41, respectively, to facilitate passage of neutrons to and from the rotor. Passage of neutrons along the periphery of the rotor 15 is prevented by a pair of neutron impervious shields 43 and 44 that are suitably attached to the frame 10 adjacent the ends of the rotor.

The rotor 15 is rotated at high speed in a direction such that a neutron traveling parallel to the rotor axis and entering the lower end of the helical passageway 39 formed collectively by the disk openings 37 will remain within the confines of the passageway as the neutron travels toward the upper end of the rotor. If the pitch of the helical slot and the angular velocity of the rotor are known, the linear velocity of the neutrons emerging from the remote end of the slot may be computed.

In this connection, it may be noted that a neutron will advance through the helical passage 39 one pitch length at each revolution of the rotor 15. Thus, where $v$ is the speed of the neutron, the neutron travels $$\frac{v}{p}$$

pitch lengths per second. Consequently the rate of rotation of the rotor, in revolutions per second (R. P. S.), may be expressed as $$\frac{v}{p}$$

It will be obvious that if the length ($l$) of the rotor 15 is equal to the length ($p$) of the pitch of passage 39, the passage will describe one complete turn of 360° around the rotor. If $l=\frac{1}{2}p$ the passage will describe a half turn around the rotor, and if $l=\frac{1}{4}p$, the passage will describe a quarter turn around the rotor, etc. Hence, $$\frac{l}{p}$$

expresses the distance which the passage extends around the periphery of the rotor 15. If the passage describes a complete turn around the rotor, the passage extends through an angle of 360°, as viewed endwise of the rotor. Thus, the relative angular position of the respective ends of the passage is expressed as $$\frac{l}{p} \times 360$$

in degrees.

For example, if it is desired to design a device, such as above-described, wherein a rotor, two meters in length, rotating at a speed of 30,000 R. P. M., or 500 R. P. S., will pass neutrons with a velocity of 2000 meters per second, the problem is to determine the relative angular position of the ends of the helical passage 39. Since $$\frac{v}{p} = \text{R. P. S.}$$

then $$500 = \frac{2000}{p} \text{ or } p = \frac{2000}{500} = 4 \text{ meters}$$

Thus, the angular displacement of the ends of the passage
=360

$$\frac{l}{p} = \frac{2}{4} \times 360 = 180°$$

or one half turn.

On the other hand, if the dimensions of the rotor and the speed of rotation thereof are known, the approximate speed of the neutrons passing through the helical passage may be simply calculated.

For example, if a rotor 15 is designed with a length of 2 meters and a helical passage 39 describing a turn of 120° about the periphery of the rotor, and if the rotor is rotating at a speed of 250 R. P. S., the approximate velocity of the neutrons passing through the passage may be calculated as follows:

$$\frac{l}{p} \times 360 = 120$$

$$\frac{2}{p} \times 360 = 120$$

$$\frac{l}{p} = \frac{1}{6}$$

$$p = 6 \text{ meters}$$

Since $$\frac{v}{p} = 250 \text{ R. P. S.}$$

$$\frac{v}{6} = 250$$

$$v = 1500 \text{ meters per second}$$

It will be apparent that as the openings 37 are made narrower, the selectivity of the device as to neutronic velocities will increase. In order that the device may be uniformly selective, the openings 37 in the disks 33 are of a width that is directly proportional to the distance from the axis of rotation. Selectivity will, of course, also increase as the length of the rotor is increased. In this connection, it has been calculated that the device can select neutrons within a range of approximately five percent of the desired velocity. Thus if $\Delta v$ is defined as half the extreme width of the range of transmitted velocities and $v$ is the velocity transmitted in maximum abundance, $$\frac{\Delta v}{v} = \frac{\alpha l \rho}{l^2 \rho^2 - \alpha^2}$$

where:

$l$=length in centimeters,
$\rho$=pitch of slots in radians per centimeter, and
$\alpha$=angular width of slots in radians.

If $l\rho$ is much larger than $\alpha$ (slot revolves through several times its own width in length of cylinder), $$\frac{\Delta v}{v} = \frac{\alpha}{l\rho}, \text{ approximately}$$

For example, if $l$ is 200 centimeters, $\alpha$ is .01 radians (.58°), $\rho$ is .001 radians per centimeter (.006 per centimeter), and the rotor is rotated at 10,000 R. P. M., then $v$ is 1,000,000 centimeters per second (½ ev.) and $$\frac{\Delta v}{v} \text{ is } .05$$

In another example, if $l$ is 200 centimeters, $\alpha$ is .001 radians (.06°), $\rho$ is .0001 radians per centimeter (.006° per centimeter), and the rotor is rotated at 20,000 R. P. M., then $v$ is 20,000,000 centimeters per second (200 ev.) and $$\frac{\Delta v}{v} \text{ is } .05$$

Referring now to Fig. 3, it may be noted that the neutron beam is diagrammatically indicated at 58 and emanates from a source 60. It may be noted that the leading end of the helical passageway 39, as the rotor 15 rotates in the direction of the arrow, is disposed at the bottom of the rotor which is bombarded by the neutron beam. The helical angle of the passageway 39 is less than a right angle with respect to the longitudinal axis of the neutron beam 58 or, in other words, the direction of flow of neutrons constituting the beam; and this axis or direction of neutron flow is preferably although not necessarily parallel to or coaxial with the rotating axis of the rotor 15. Thus it will be understood that under these conditions, inasmuch as neutrons move in a substantially straight line, neutrons of a predetermined velocity may pass through the passageway 39 which because of rotation of the rotor defines a straight path open from end to end of the rotor for neutrons within a predetermined energy or velocity range. Neutrons moving at energies higher or lower than this range contact the rotor at the margins of the passage and are absorbed by the rotor. If the rotor 15 were rotated in the opposite direction, no neutrons would be able to pass along the passage inasmuch as the leading edge thereof would be at the top of the rotor and all neutrons would be trapped within the passage 39 and would be absorbed by the rotor.

An alternative disk structure is shown in Fig. 5. Here the disk is solid aluminum, or other material that is relatively pervious to neutrons. The disk is plated with cadmium or other material that is relatively impervious to neutrons and the plating removed from areas to form openings of the desired shape. This structure forms a stronger disk, and in addition, difficulty encountered with the above-described disk of machining sufficiently narrow openings in the disks to obtaining desired selectivity Another disk structure is shown in Fig. 6. Holes 48 of a diameter proportional to their distance from the axis are drilled in the disk 33, which is of a material relatively impervious to neutrons.

Fig. 7 shows an alternative rotor structure. Instead of a solid stack of disks 33, a few disks are distributed along the shaft 25 with spacings calculated to eliminate harmonics of the neutron velocity desired. This structure results in considerable saving in material and labor and makes the apparatus a good deal lighter.

In order to rotate the rotor 15 at desired angular velocity, the belt 32 that drives the pulley 31 on the lower rotor spindle 29 may be driven by a pulley 50 mounted on the shaft of synchronous motor 52. The motor 52 is supplied with alternating current from a variable frequency power oscillator 54. By adjusting the frequency of the alternating current supplied to the motor 52 the speed of the rotor 15 may be determined.

Speed of the rotor may be determined also by stroboscopic means. The periphery of one or more of the disks 33 may be suitably marked, or the ends of the disk openings 37 may be used for reference. An opening 57 in the frame 10 serves as a stroboscopic viewing aperture and a variable frequency stroboscopic light source 59 may also illuminate the disk periphery through the opening 57. Adjusting the stroboscopic frequency until the indicia on the disk appear to stand still gives an accurate indication of rotor speed whereas there is a possibility of some slipping of the belt 32 at the speeds involved which may run as high as 40,000 R. P. M. when the apparatus is used to select the fastest of the so-called thermal neutrons.

While the invention has been illustrated by apparatus in which the passageway through which the desired neutrons must pass is defined by a member or members rotating on a common shaft, it is contemplated that the members defining such a passageway could be translated across a neutron beam by other means. One possible structure would provide a plurality of members independently mounted and separately rotated as by air jets impinging on turbine blades cut in the disk peripheries. The individual speeds of the several members would be adjusted by varying the air supply pressures. Synchronization could be obtained by stroboscopic means.

Likewise the rotor of the apparatus illustrated and described could be driven by an air turbine rather than by the belt and synchronous motor shown.

Referring to Fig. 8, the selector is shown in side elevation in the path of a neutron beam 58 emanating from a source 60, said selector being operable as above-described to select neutrons within a predetermined energy range which issue as a beam 62 from the top of the selector and impinge on a sample 64 to be bombarded by neutrons within this range.

Fig. 9 shows diagrammatically a modification of the selector adapted to supply an intermittent flow of neutrons within a predetermined energy range. This apparatus comprises a neutron absorbent block 66 shown in central vertical cross section, said block comprising a diagonal neutron passage 68 of air or other neutron permeable material disposed angularly at an angle less than a right angle to the axis of a neutron beam 70 emanating from a source 72 of neutrons of various energies. The block 66 is moved by means (not shown) in the direction of the arrow, with the leading end of the passage 39 within the flow of neutrons of the beam 70, so as to briefly accommodate a straight path between the beam 70 and a sample 74 for neutrons within a predetermined energy range dependent upon the rate of speed at which the block is moved.

In the foregoing there has been described a new and improved neutron velocity selector possessing important advantages over the prior known devices. The particular features of the invention which are believed to be new are expressly pointed out in the appended claims.

What is claimed is:

1. Apparatus for selecting neutrons of a predetermined velocity comprising a member rotatable on an axis adapted to be located generally parallel to an associated beam of neutrons, said member being constructed of boron steel and being provided with a helical duct around the axis of rotation and within the rotatable member containing air, and means to continuously rotate the member within the beam of neutrons.

2. Apparatus for selecting neutrons of a predetermined velocity comprising a member rotatable on an axis adapted to be located generally parallel to an associated beam of neutrons, said member comprising material relatively impermeable to neutrons provided with a helical passageway around the axis of rotation of a material relatively permeable to neutrons, said helical passageway being disposed within the member, and means to continuously rotate the member in the beam of neutrons.

References Cited in the file of this patent

UNITED STATES PATENTS

| 558,213 | Shedlock | Apr. 14, 1896 |
| 2,061,387 | Prinz | Nov. 17, 1936 |
| 2,253,035 | Kallmann et al. | Aug. 19, 1941 |

FOREIGN PATENTS

| 233,011 | Switzerland | Oct. 2, 1944 |

OTHER REFERENCES

Physical Review—2nd Series, vol. 48 (1935), page 704. (An article by Dunning et al.)

Physical Review—2nd Series, vol. 50 (1936), pages 738–747. (An article by Fink.)

Block—"A Mechanical Velocity Selector for Neutrons," AECD–2702; Date of Manuscript—November 17, 1944; Date declassified—August 26, 1949; 4 pages.